(12) United States Patent
Takahashi

(10) Patent No.: US 10,384,345 B2
(45) Date of Patent: Aug. 20, 2019

(54) SAFETY MANAGEMENT METHOD AND SAFETY MANAGEMENT SYSTEM

(71) Applicant: Fanuc Corporation, Yamanashi (JP)

(72) Inventor: Yuuki Takahashi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 140 days.

(21) Appl. No.: 15/631,556

(22) Filed: Jun. 23, 2017

(65) Prior Publication Data
US 2018/0029230 A1 Feb. 1, 2018

(30) Foreign Application Priority Data
Jul. 27, 2016 (JP) .................. 2016-147722

(51) Int. Cl.
  *B25J 9/16* (2006.01)
  *G05B 19/042* (2006.01)
  *G06F 9/48* (2006.01)

(52) U.S. Cl.
CPC ........... *B25J 9/1656* (2013.01); *B25J 9/1674* (2013.01); *B25J 9/1676* (2013.01); *G05B 19/0426* (2013.01); *G05B 19/0428* (2013.01); *G06F 9/4887* (2013.01); *G05B 2219/24211* (2013.01); *G05B 2219/25343* (2013.01);
(Continued)

(58) Field of Classification Search
CPC ........ B25J 9/023; B25J 9/1656; B25J 9/1674; B25J 9/1676; B25J 9/1697; B25J 19/023; F16P 3/142; F16P 3/144; G05B 19/0429; G05B 19/4061; G05B 2219/375567; G05B 2219/39088; G05B 2219/40202;
(Continued)

(56) References Cited

U.S. PATENT DOCUMENTS

2002/0186299 A1* 12/2002 Cofer ............... F16P 3/142
                                                          348/152
2004/0125206 A1    7/2004 Lohmann
(Continued)

FOREIGN PATENT DOCUMENTS

EP       1457730 A2     9/2004
JP    2001-320698 A    11/2001
(Continued)

OTHER PUBLICATIONS

Japan Patent Office, Office Action dated Jul. 31, 2018 for Japan Patent Application No. 2016-147722.

*Primary Examiner* — Dale Moyer
(74) *Attorney, Agent, or Firm* — Winstead PC

(57) ABSTRACT

A safety management method sets a third space that both a worker and a robot can enter between a first space in which the worker is present and a second space in which the robot is disposed; sets, between the first space and the third space and between the second space and the third space, respectively, boundaries for monitoring crossing thereof; monitors the presence/absence of the robot or the worker in the third space; when a state of crossing of one boundary and a state of the worker or the robot in the third space are simultaneously switched to "detection", restricts the operation of the robot, when crossing of another boundary is detected; and not restricts the operation of the robot when the state of crossing of the one boundary and the state of the worker or the robot in the third space are simultaneously switched to "non-detection".

10 Claims, 14 Drawing Sheets

OPERATION-RESTRICTED STATE

(52) U.S. Cl.
CPC .............. *G05B 2219/25347* (2013.01); *G05B 2219/34382* (2013.01); *G05B 2219/34383* (2013.01); *G05B 2219/40203* (2013.01)

(58) Field of Classification Search
CPC ........... G05B 2219/40203; G05B 2219/40409; G05B 2219/43202; G05B 2219/49158
See application file for complete search history.

(56) References Cited

U.S. PATENT DOCUMENTS

| | | | |
|---|---|---|---|
| 2004/0227816 A1 | 11/2004 | Sato et al. | |
| 2010/0191372 A1* | 7/2010 | Nihei | B25J 9/1676 700/245 |
| 2012/0327190 A1* | 12/2012 | Massanell | B25J 9/1676 348/46 |
| 2014/0207285 A1 | 7/2014 | Sakabe | |
| 2014/0244037 A1* | 8/2014 | Scott | B25J 9/1694 700/253 |
| 2014/0288707 A1* | 9/2014 | Asahi | B25J 9/1674 700/253 |
| 2015/0131896 A1 | 5/2015 | Hu et al. | |
| 2015/0217455 A1 | 8/2015 | Kikkeri et al. | |
| 2016/0229068 A1* | 8/2016 | Haman | B25J 9/1676 |

FOREIGN PATENT DOCUMENTS

| | | |
|---|---|---|
| JP | 2003-162776 A | 6/2003 |
| JP | 2004530090 A | 9/2004 |
| JP | 2004-276154 A | 10/2004 |
| JP | 2008191823 A | 8/2008 |
| JP | 2010-234495 A | 10/2010 |
| JP | 5035768 B2 | 9/2012 |
| JP | 2013-010161 A | 1/2013 |
| JP | 2014-140920 A | 8/2014 |
| WO | WO-02101279 A1 | 12/2002 |

* cited by examiner

FIG. 6

| NUMBER | IN THREE-DIMENSIONAL SPACE FLAG F1 | MONITORING BOUNDARY A FLAG F2 | MONITORING BOUNDARY B FLAG F3 | STATE FLAG FK |
|---|---|---|---|---|
| 1 | ON→OFF | ON→OFF | OFF | CANCEL ALERT |
| 2 | ON→OFF | OFF | ON→OFF | CANCEL ALERT |
| 3 | OFF→ON | OFF→ON | OFF | ALERT |
| 4 | OFF→ON | OFF | OFF→ON | ALERT |
| 5 | ON | ON→OFF | OFF | ALERT |

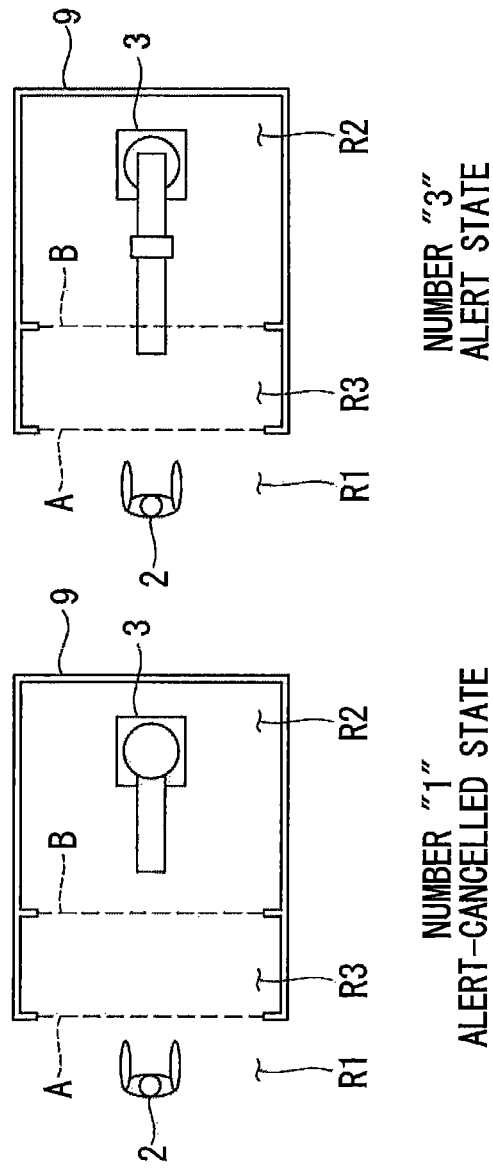

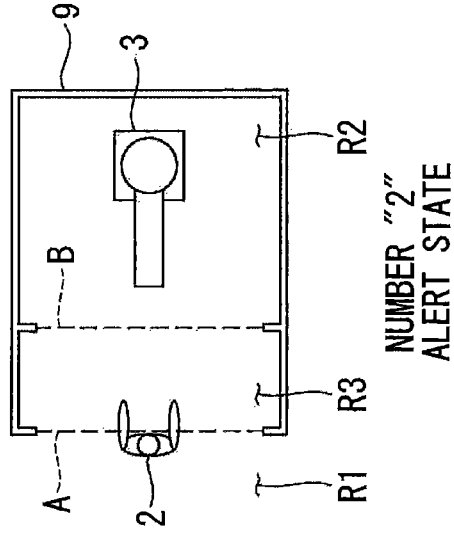

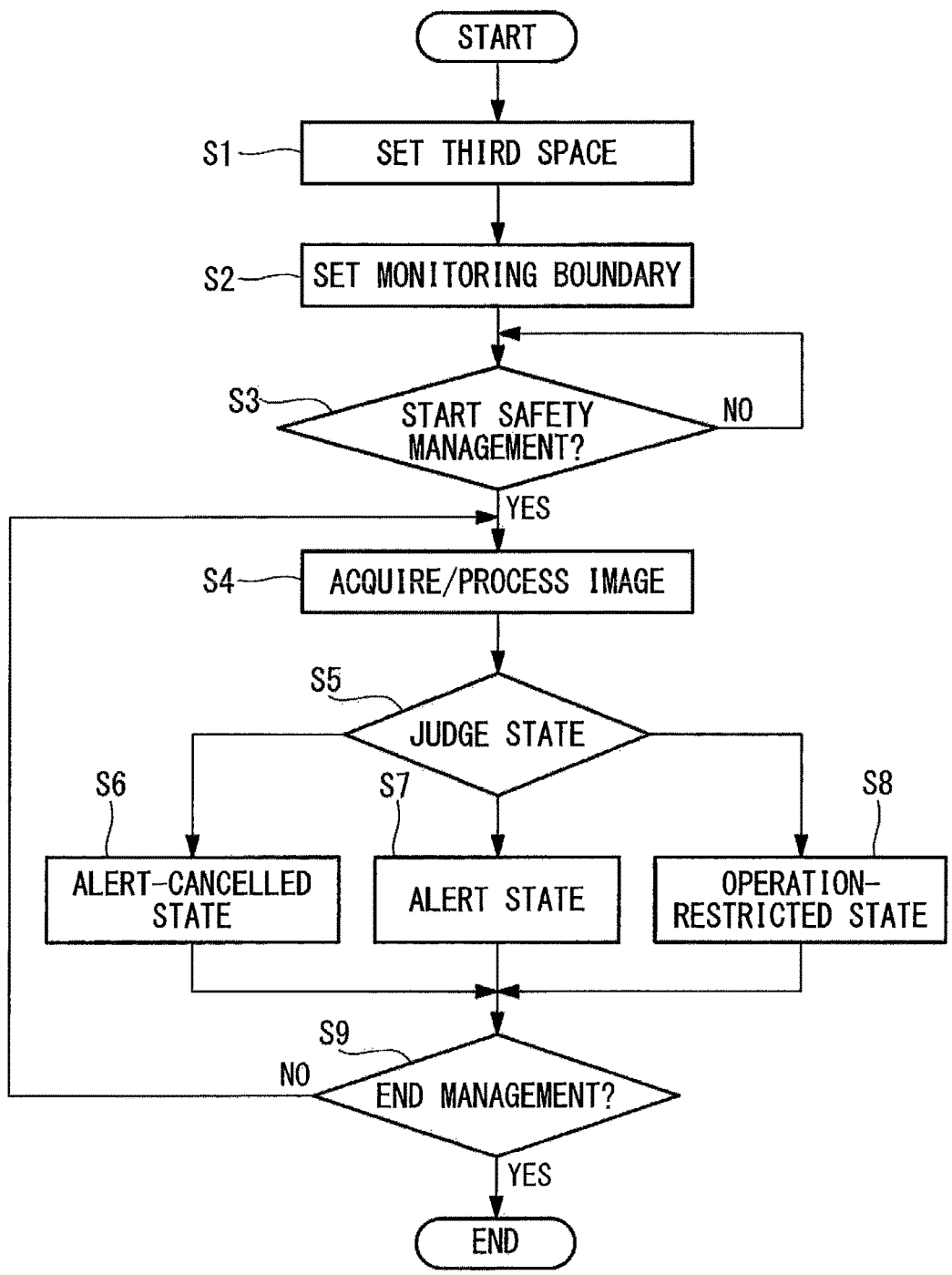

OPERATION-RESTRICTED STATE

OPERATION-RESTRICTED STATE

OPERATION-RESTRICTED STATE

ALERT STATE

SAFETY MANAGEMENT METHOD AND SAFETY MANAGEMENT SYSTEM

CROSS-REFERENCE TO RELATED APPLICATIONS

This application is based on Japanese Patent Application No. 2016-147722, the contents of which are incorporated herein by reference.

TECHNICAL FIELD

The present invention relates to a safety management method and a safety management system.

BACKGROUND ART

In the related art, in a robot system, although an area in which a robot operates and an area in which there is worker traffic are sectioned by using a safety fence, in the case in which a worker needs to frequently enter the area in which the robot operates in order to supply a work or the like to the robot, there is a problem in that productivity is considerably reduced due to the time and effort involved in unlocking a physical lock or the like.

In order to eliminate such a problem, a technology for detecting the worker in the area in which the robot operates has been developed (for example, see Patent Literatures 1 to 3).

The technology of Patent Literature 1 is a technology with which the presence/absence of a worker in the area in which the robot operates is detected by using a mat that is installed in this area and that detects the weight of the worker.

The technology of Patent Literature 2 is a technology with which the presence/absence of a worker in the area in which the robot operates is monitored by using a camera.

The technology of Patent Literature 3 is a technology with which a common area that is divided by using double light curtains is formed between the area in which the robot operates and the area in which there is worker traffic, and with which, when the entry of the robot or the worker into the common area is detected by one of the light curtains, the robot is subsequently stopped by means of detection signals from the other light curtain.

CITATION LIST

Patent Literature

{PTL 1} Publication of Japanese Patent No. 5035768
{PTL 2} Japanese Translation of PCT International Application, Publication No. 2004-530090
{PTL 3} Japanese Unexamined Patent Application, Publication No. 2008-191823

SUMMARY OF INVENTION

An object of the present invention is to provide a safety management method and a safety management system with which it is possible to more reliably ensure the safety of a worker without reducing the productivity of a robot.

Solution to Problem

An aspect of the present invention provides a safety management method including: setting a third space that both a worker and a robot can enter between a first space in which the worker is mainly present and a second space in which the robot is mainly disposed; setting, between the first space and the third space and between the second space and the third space, respectively, monitoring boundaries for monitoring crossing thereof; monitoring the presence/absence of the robot or the worker in the third space; when a monitoring state of crossing of one monitoring boundary and a monitoring state of the worker or the robot in the third space are substantially simultaneously switched from "non-detection" to "detection", setting an alert state, in which the operation of the robot is restricted, when crossing of another monitoring boundary is detected; and canceling the alert state only when the monitoring state of crossing of the one monitoring boundary and the monitoring state of the worker or the robot in the third space are substantially simultaneously switched from "detection" to "non-detection".

In the above-described aspect, in a state in which the alert state is set, the robot may be stopped when crossing of the another monitoring boundary is detected.

The above-described aspect may include: acquiring, over time, images that include the third space and at least a portion of the first space and the second space adjacent to the third space; and monitoring crossing of the monitoring boundaries and the presence/absence of the worker or the robot in the third space on the basis of any one of the acquired images.

In the above-described aspect, the image may be a three-dimensional distance image.

In the above-described aspect, the worker may be notified that the alert state has been set.

Another aspect of the present invention provides a safety management system comprising: a boundary setting portion that sets a third space that both a worker and a robot can enter between a first space in which the worker is mainly present and a second space in which the robot is mainly disposed, and sets monitoring boundaries between the first space and the third space and between the second space and the third space; a boundary-crossing monitoring portion that monitors crossing of the individual monitoring boundaries set by the boundary setting portion; an in-space monitoring portion that monitors the presence/absence of the worker or the robot in the third space set by the boundary setting portion; and a control portion that controls the robot on the basis of an output from the boundary-crossing monitoring portion and an output from the in-space monitoring portion, wherein, when a monitoring state of crossing of one monitoring boundary monitored by the boundary-crossing monitoring portion and a monitoring state of the worker or the robot in the third space monitored by the in-space monitoring portion are substantially simultaneously switched from "non-detection" to "detection", the control portion sets an alert state in which the operation of the robot is restricted, when crossing of another monitoring boundary is detected by the boundary-crossing monitoring portion, and the control portion cancels the alert state only when the monitoring state of crossing of the one monitoring boundary monitored by the boundary-crossing monitoring portion and the monitoring state of the worker or the robot in the third space monitored by the in-space monitoring portion are substantially simultaneously switched from "detection" to "non-detection".

In the above-described aspect, in a state in which the alert state is set, the control portion may control the robot so as to stop the robot when crossing of the another monitoring boundary is detected by the boundary-crossing monitoring portion.

The above-described aspect may be provided with an image acquisition portion that acquires, over time, images that include the third space and at least a portion of the first space and the second space adjacent to the third space, wherein the boundary-crossing monitoring portion and the in-space monitoring portion may monitor crossing of the monitoring boundaries and the presence/absence of the worker or the robot in the third space on the basis of any one of the images acquired by the image acquisition portion.

In the above-described aspect, the image may be a three-dimensional distance image.

The above-described aspect may be provided with a notifying portion that notifies the worker that the alert state has been set by the control portion.

BRIEF DESCRIPTION OF DRAWINGS

FIG. 6 is a diagram showing states of individual flags when switching to an alert state and to an alert-cancelled state in the safety management system in FIG. 1.

FIG. 8A is a plan view showing the alert-cancelled state.

FIG. 8B is a plan view showing the alert state that is set when a robot enters the third space.

FIG. 9A is a plan view showing a state in which the worker has crossed one of two monitoring boundaries.

FIG. 9B is a plan view showing a state in which the worker has completely entered the third space.

FIG. 10 is a flowchart showing a safety management method according to an embodiment of the present invention.

DESCRIPTION OF EMBODIMENT

A safety management method and a safety management system 1 according to an embodiment of the present invention will be described below with reference to the drawings.

Figure 1:
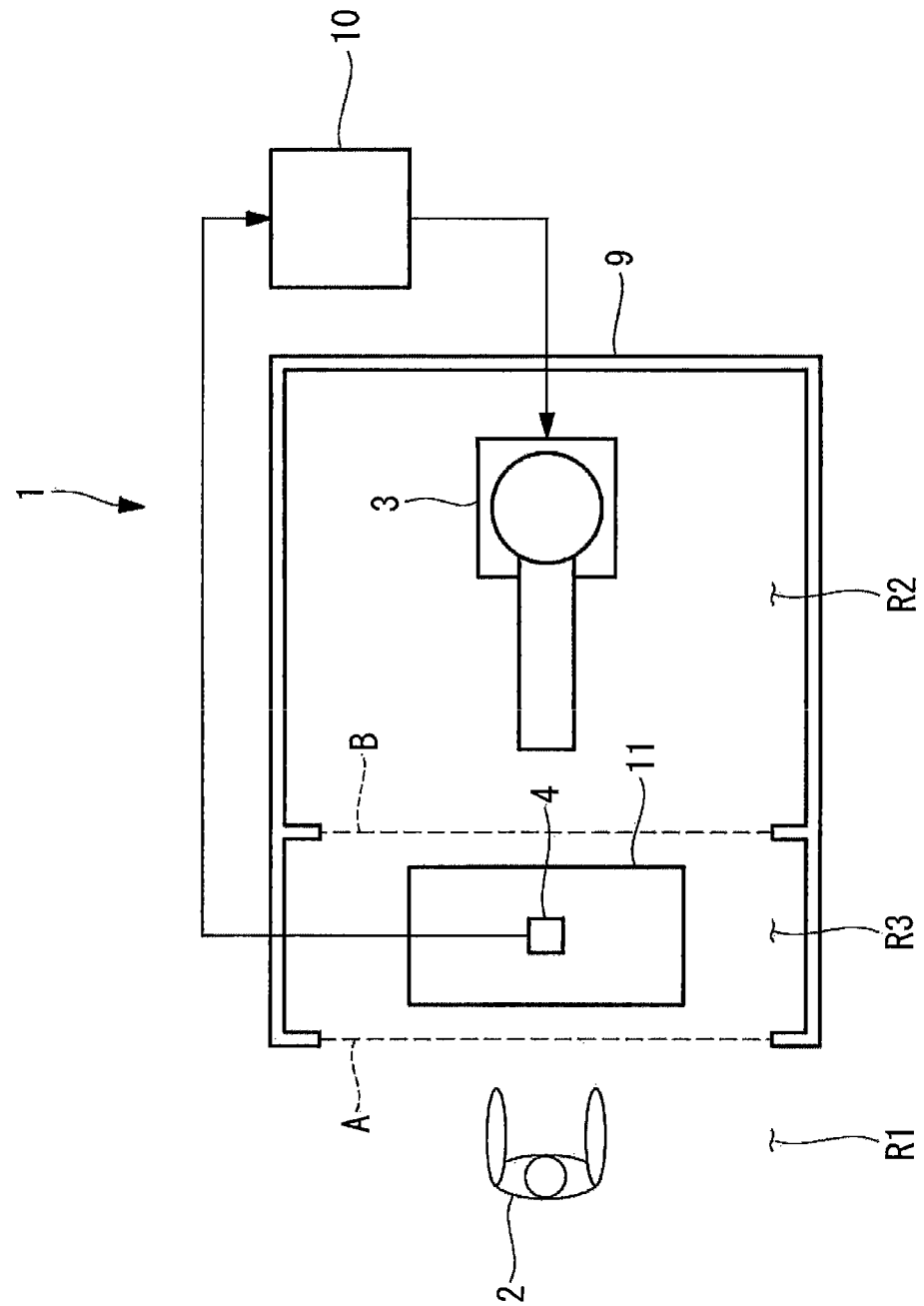
FIG. 1 is a plan view showing a safety management system according to an embodiment of the present invention.
Figure 2:
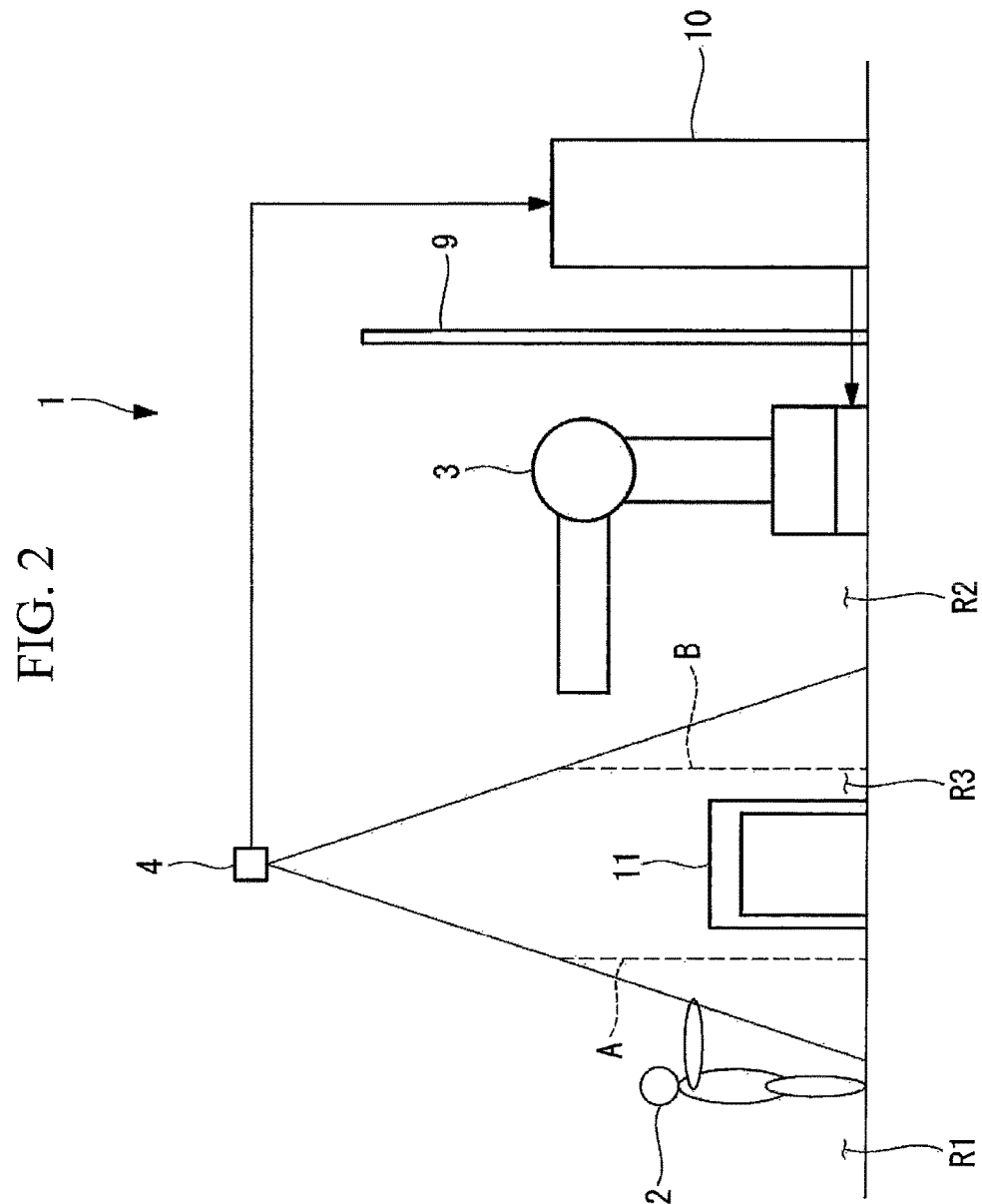
FIG. 2 is a side view of the safety management system in FIG. 1.

As shown in FIGS. 1 and 2, with the safety management method according to this embodiment, a third space R3 that both a worker 2 and a robot 3 can enter is set between a first space R1 in which the worker 2 is mainly present and a second space R2 in which the robot 3 is installed; monitoring boundaries A and B are set between the first space R1 and the third space R3 and between the second space R2 and the third space R3, respectively; crossing of the monitoring boundaries A and B is monitored, and the interior of the third space R3 is also monitored; and the robot 3 is controlled on the basis of the monitoring results.

Figure 3:
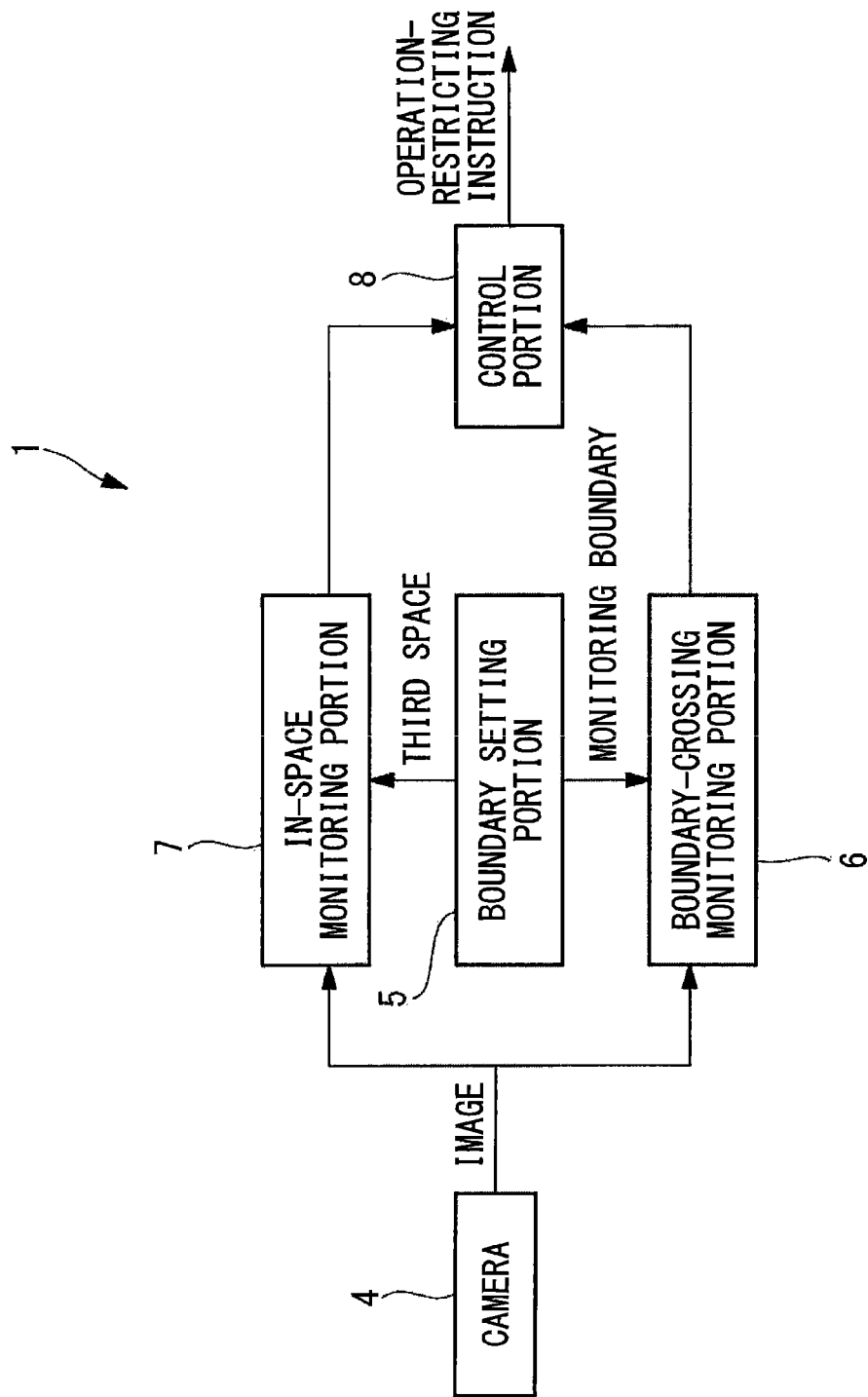
FIG. 3 is a block diagram showing the safety management system in FIG. 1.

As shown in FIGS. 1 to 3, the safety management system 1 according to this embodiment is provided with: a camera (image acquisition portion) 4 that is installed at a position at which the entire third space R3 and at least portions of the first space R1 and the second space R2 adjacent to the third space R3 are in the viewing field thereof; a boundary setting portion 5 that sets the third space R3 and the two monitoring boundaries A and B; a boundary-crossing monitoring portion 6 that monitors crossing of the individual monitoring boundaries A and B on the basis of the information about the two monitoring boundaries A and B set by the boundary setting portion 5 and the image output from the camera 4; an in-space monitoring portion 7 that monitors the presence/absence of the worker 2 or the robot 3 in the third space R3 on the basis of the information about the third space R3 set by the boundary setting portion 5 and the image output from the camera 4; and a control portion 8 that outputs operation-restricting instructions for restricting the robot 3 on the basis of the outputs from the boundary-crossing monitoring portion 6 and the in-space monitoring portion 7. In FIGS. 1 and 2, reference sign 9 indicates a safety fence, and reference sign 10 indicates a control device that accommodates portions from the boundary setting portion 5 to the control portion 8.

Specifically, the camera 4 is capable of acquiring a distance image that includes three-dimensional information. The boundary setting portion 5 is configured so that the third space R3 and the monitoring boundaries A and B can be defined on the basis of three-dimensional coordinates. In the example shown in the figures, the boundary setting portion 5 defines the two monitoring boundaries A and B as two planes that extend in the vertical direction with spacing therebetween so as to be parallel to each other in the horizontal direction, and defines the third space R3 as a cubic space interposed between the two monitoring boundaries A and B.

Figure 4:
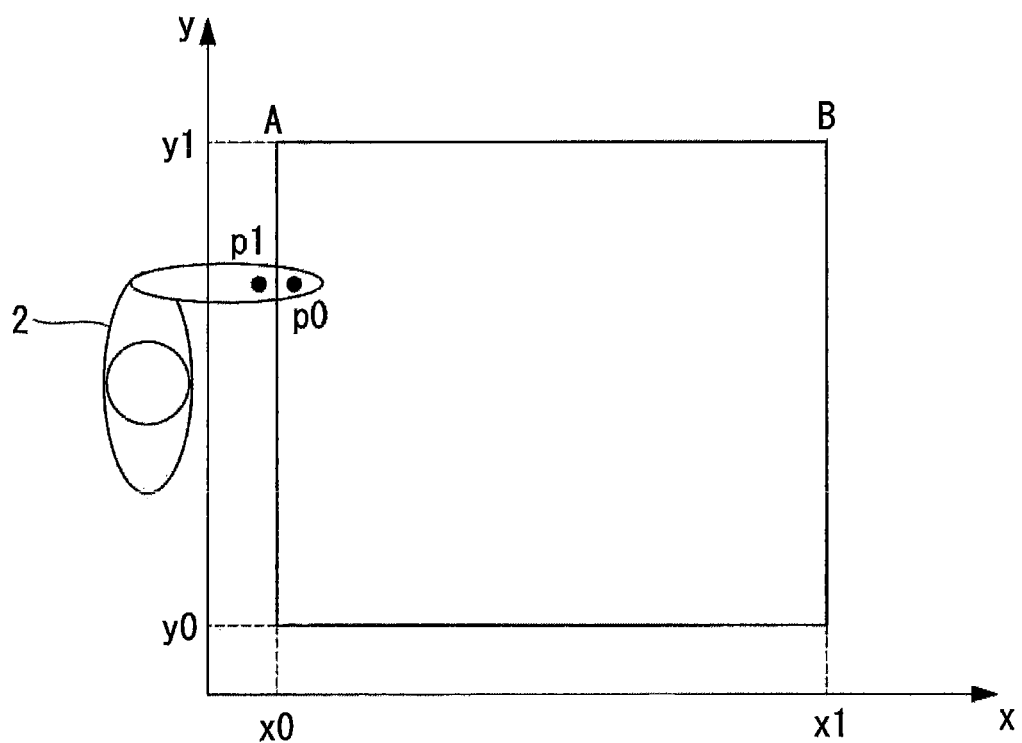
FIG. 4 is a plan view for explaining detection of crossover and the presence of an object in a third space by means of the safety management system in FIG. 1.
Figure 5:
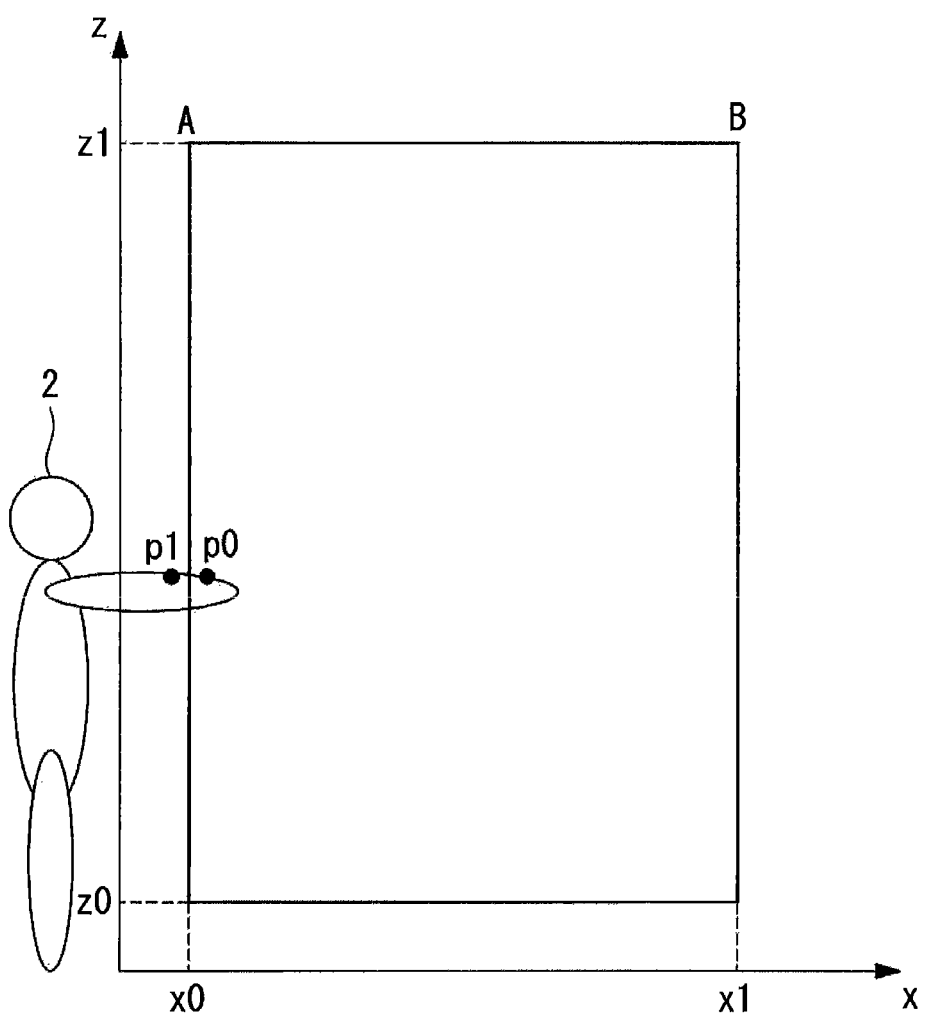
FIG. 5 is a side view of FIG. 4.

In other words, as shown in FIGS. 4 and 5, the third space R3 is defined as a space having the three-dimensional coordinates below:
$x0 \leq x \leq x1$;
$y0 \leq y \leq y1$; and
$z0 \leq z \leq z1$.

The monitoring boundary A is defined as a plane having the three-dimensional coordinates below:
$x = x0$;
$y0 \leq y \leq y1$; and
$z0 \leq z \leq z1$.

The monitoring boundary B is defined as a plane having the three-dimensional coordinates below:
$x = x1$;
$y0 \leq y \leq y1$; and
$z0 \leq z \leq z1$.

The worker 2 (or the robot 3) can be judged to be in the third space R3 when, in the individual images acquired by the camera 4 over time at a predetermined frame rate, the three-dimensional coordinates (xp0, yp0, and zp0) of an arbitrary point p0 on the worker 2 (or the robot 3) satisfy all of the conditions below:

$x0 \leq xp0 < x1$;
$y0 \leq yp0 \leq y1$; and
$z0 \leq zp0 \leq z1$.

When the three-dimensional coordinates (xp1, yp1, and zp1) of an arbitrary point p1 on the worker 2 (or the robot 3), which is a pixel adjacent to the point p0, satisfy all of the conditions below, because a straight line connecting the point p0 and the point p1 crosses the monitoring boundary A at x=x0, the worker 2 (or the robot 3) can be judged to have crossed the monitoring boundary A:

$xp1 < x0$;
$y0 \leq yp1 \leq y1$; and
$z0 \leq zp1 \leq z1$.

The in-space monitoring portion 7 is configured so as to judge that the worker 2 or the robot 3 is present in the third space R3 when the presence of an object is detected in the images acquired by the camera 4 at any one of the three-dimensional coordinates in the third space R3 defined by the boundary setting portion 5. The in-space monitoring portion 7 sets a flag F1 (monitoring state) to "ON" (detection) when it is judged that the worker 2 or the robot 3 is present in the third space R3, and sets the flag F1 to "OFF" (non-detection) when it is judged that the worker 2 or the robot 3 is absent therefrom.

With this embodiment, because a work table 11 is disposed in the third space R3, the region of the work table 11 is excluded from the object monitoring area of the in-space monitoring portion 7. In other words, when the worker 2 completely enters the area of the work table 11, the flag F1 in the third space R3 is set to "OFF".

The boundary-crossing monitoring portion 6 is configured so as to judge that the worker 2 or the robot 3 has crossed the monitoring boundaries A and B when the presence of an object is detected in the images acquired by the camera 4 at two pixels that are adjacent to each other in the horizontal direction and that are on either side of any one of the three-dimensional coordinates representing the monitoring boundaries A and B defined by the boundary setting portion 5. The boundary-crossing monitoring portion 6 sets flags F2 and F3 to "ON" (detection) when it is judged that the monitoring boundaries A and B have been crossed, and sets the flags F2 and F3 to "OFF" (non-detection) when it is judged that the monitoring boundaries A and B have not been crossed.

The control portion 8 is configured so as to set a flag FK to an "alert state" when the settings of the flags F1, F2, and F3 set by the in-space monitoring portion 7 and the boundary-crossing monitoring portion 6 are switched from an "alert-cancelled state", in which all flags are set to "OFF", to a state indicated by number "3" or "4" in FIG. 6.

In other words, the control portion 8 is configured so as to set the flag FK to the alert state when one of the flags F2 and F3 for the monitoring boundaries A and B and the flag F1 for the third space R3 substantially simultaneously change from "OFF" to "ON".

When the worker 2 or the robot 3 has crossed one of the monitoring boundaries A and B, one of the flags F2 and F3 for the monitoring boundaries A and B and the flag F1 for the third space R3 change substantially simultaneously. "Substantially simultaneously" includes a situation in which, even though the changes in the states of the flags simultaneously occur, there are minute time lags in the times at which the changes are detected due to the order of detection and computational delays.

On the other hand, the control portion 8 is configured so as to set the flag FK to the alert-cancelled state only when the flag F2 (or F3) set by the boundary-crossing monitoring portion 6 for the monitoring boundary A (or B) and the flag F1 set by the in-space monitoring portion 7 regarding the presence/absence of the worker 2 or the robot 3 in the third space R3 have simultaneously been switched from "ON" to "OFF", as indicated by number "1" or "2" in FIG. 6.

Figure 7A:
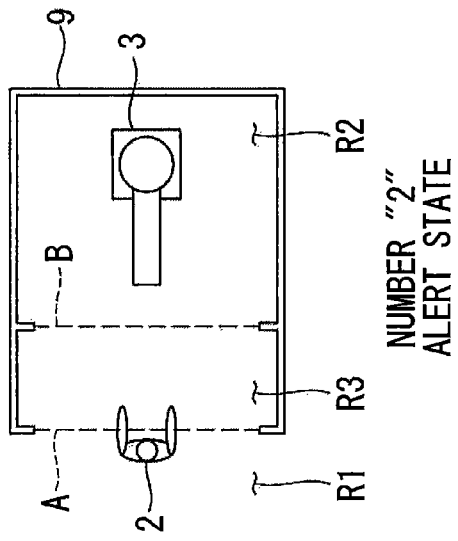
FIG. 7A is a plan view showing the alert-cancelled state.

The alert-cancelled state refers to a state in which neither the worker 2 nor the robot 3 has entered the third space R3, as shown in FIGS. 7A and 8A, and the alert state refers to a state in which the worker 2 or the robot 3 has entered the third space R3 by crossing the monitoring boundary A (or B), as shown in FIGS. 7B, 8B, 9A, and 9B.

The control portion 8 is configured so that, when in the alert state, the operation of the robot 3 is restricted when the worker 2 or the robot 3 has entered the third space R3 by crossing the monitoring boundary B (or A).

Ways in which the operation of the robot 3 is restricted include reducing the operating speed of the robot 3, in addition to stopping the robot 3 on the spot.

The safety management method employing the thus-configured safety management system 1 according to this embodiment will be described below.

First, as shown in FIG. 10, setting of the third space R3 (step S1) and setting of the monitoring boundaries A and B (step S2) are performed, and the system stands by until a safety-management initiating instruction signal is input (step S3).

When the safety-management initiating instruction signal is input, the camera 4 acquires the images, and the monitoring processing is performed by the in-space monitoring portion 7 and the boundary-crossing monitoring portion 6 on the basis of the acquired images (step S4).

As a result of the monitoring processing, the control portion 8 judges whether the monitoring results indicate the alert-cancelled state, the alert state, or the operation-restricted state (steps S5, S6, S7, and S8).

In the case in which it is judged that the monitoring results indicate the alert-cancelled state, the worker 2 can freely enter the third space R3, and the alert state is established at the moment the worker 2 enters the third space R3. Even after the alert state is established, the robot 3 can be operated without restriction so long as the robot 3 does not enter the third space R3. When the robot 3 enters the third space R3 in the state in which the worker 2 is in the third space R3, the operation-restricted state is established, and thus, the operation of the robot 3 is restricted.

The procedures from step S4 are repeated until a safety-management ending instruction signal is input (step S9).

Figure 7B:
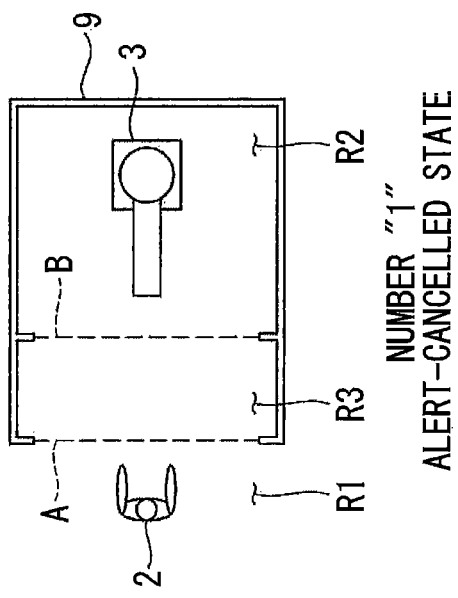
FIG. 7B is a plan view showing the alert state that is set when a worker enters the third space.

In this case, starting from the alert-cancelled state, when the monitoring boundary A (or B) is crossed, as shown in FIG. 7B or 8B, because the first flag F2 (or F3), which indicates crossing of the boundary, and the flag F1, which indicates the presence of an object in the third space R3, change substantially simultaneously from "OFF" to "ON", the control portion 8 sets the flag FK to the alert state.

Figure 11A:
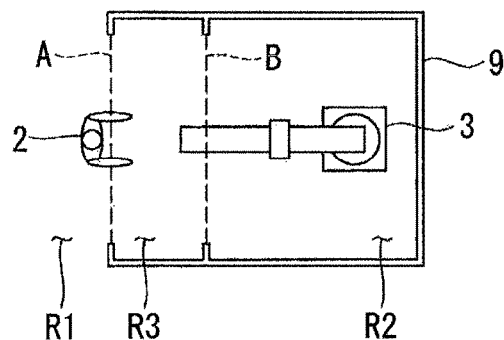
FIG. 11A is a plan view showing an operation-restricted state that is set when the worker and the robot cross over the individual monitoring boundaries.
Figure 11B:
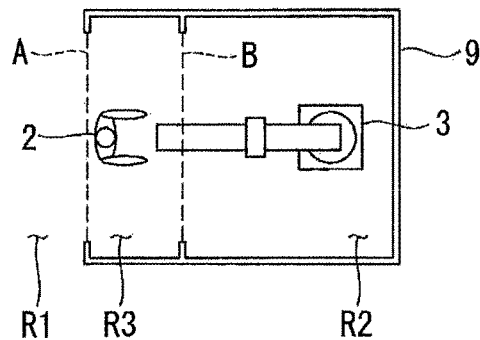
FIG. 11B is a plan view showing the operation-restricted state that is set when the robot enters the third space in the state in which the worker is present in the third space.
Figure 11C:
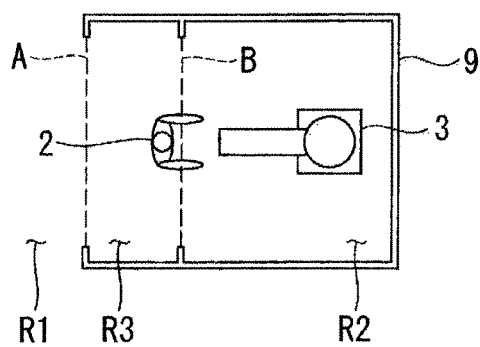
FIG. 11C is a plan view showing the operation-restricted state that is set when the worker in the third space enters a second space in which the robot is present.

In this state, as shown in FIGS. 11A, 11B, and 11C, at the moment the second flag F3 (or F2) that indicates crossing of the boundary is switched from "OFF" to "ON", the control portion 8 switches the flag FK to the operation-restricted state, thus restricting the operation of the robot 3.

FIG. 11A shows both the case in which the flag F3 is switched from "OFF" to "ON" due to the entry of the robot 3 into the third space R3 in the alert state indicated by number "3" in FIG. 6 and the case in which the flag F9 is switched from "OFF" to "ON" due to the entry of the worker 2 into the third space R3 in the alert state indicated by number "4" in FIG. 6.

FIG. 11B shows the case in which the flag F3 is switched from "OFF" to "ON" due to the entry of the robot 3 into the third space R3 in the alert state indicated by number "5" in FIG. 6.

By doing so, both when the robot 3 enters the third space R3 in the alert state in which the worker 2 is working in the third space R3, and when the worker 2 enters the third space R3 in the alert state in which the robot 3 is working in the third space R3, the operation of the robot 3 is restricted, and thus, the safety of the worker 2 is ensured.

Once the alert state is established, switching to the alert-cancelled state is not performed unless the flag F2 or the flag F3, which indicates crossing of one of the monitoring boundaries A and B, thus causing the alert state to be established, and the flag F1, which indicates the presence of an object in the third space R3 are both substantially simultaneously switched from "ON" to "OFF".

Figure 12:
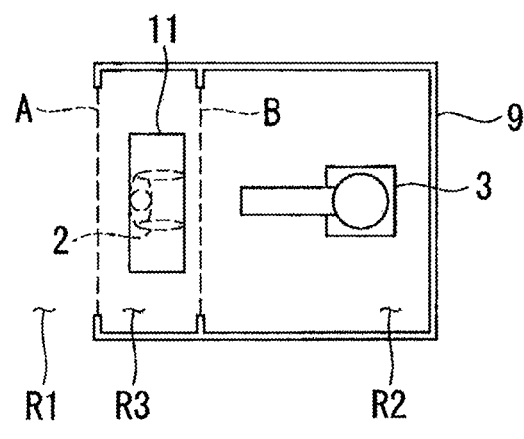
FIG. 12 is a plan view showing the alert state in which the worker is hidden in a blind spot of a work table.

In other words, when the worker 2 has completely entered the third space R3 by crossing the monitoring boundary A, the flag F1 is set to "ON", and the flags F2 and F3 are set to "OFF", and, when the worker 2 subsequently gets under the work table 11 and the flag F1, which indicates the presence of an object in the third space R3, is set to "OFF", as shown in FIG. 12, all of the flags F1, F2, and F3 are set to "OFF". However, in this case, because only the flag F1 is switched from "ON" to "OFF", the alert state is maintained, and when the robot 3 has entered the third space R3 by crossing the monitoring boundary B, the operation-restricted state is established, and the operation of the robot 3 is restricted.

Figure 13:
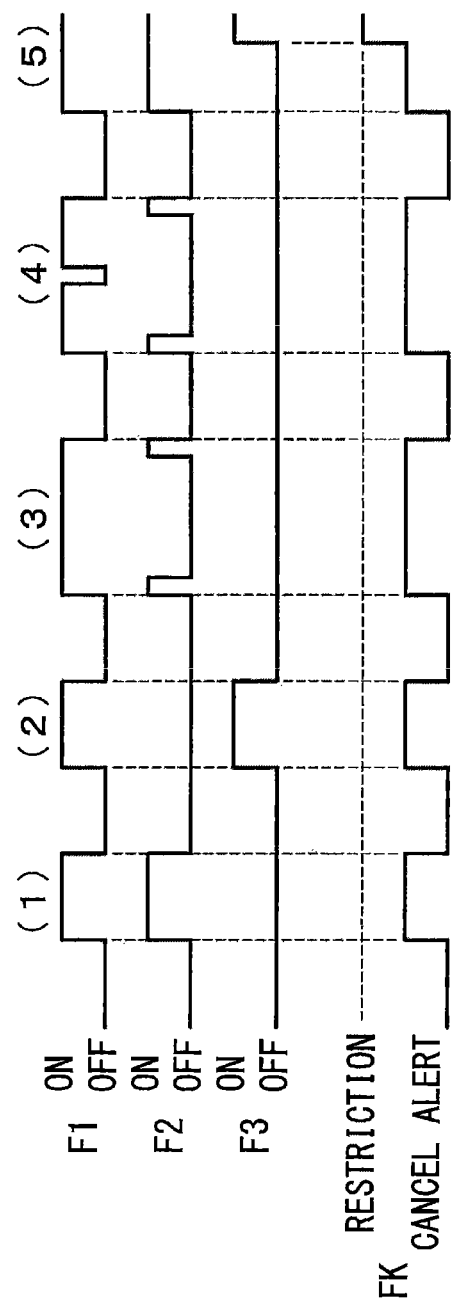
FIG. 13 is a time chart showing example changes in the flags.

FIG. 13 shows changes of the flags F1, F2, F3, and FK for five cases, namely, cases (1) to (5).

Case (1) is a case in which a portion of the body of the worker 2 enters the third space R3 by crossing the monitoring boundary A, and directly returns to the first space R1.

Case (2) is a case in which a portion of the robot 3 enters the third space R3 by crossing the monitoring boundary B, and directly returns to the second space R2.

Case (3) is a case in which, after the worker 2 completely enters the third space R3 once by crossing the monitoring boundary A, the worker 2 returns to the first space R1 by crossing the monitoring boundary A again.

Case (4) is a case in which, after the worker 2 completely enters the third space R3 once by crossing the monitoring boundary A, the worker 2 is temporarily hidden in a blind spot such as the work table 11 or the like, and returns to the first space R1 by crossing the monitoring boundary A again.

Case (5) is a case in which a portion of the robot 3 enters the third space R3 by crossing the monitoring boundary B in a state in which a portion of the body of the worker 2 has entered the third space R3 by crossing the monitoring boundary A.

As has been described above, with the safety management method and the safety management system 1 according to this embodiment, because the presence of an object in the third space R3 and the two monitoring boundaries A and B leading to the third space R3 are monitored, even when the worker 2 who has entered the third space R3 is hidden in a blind spot, the alert state is not cancelled, and thus, there is an advantage in that it is possible to more reliably ensure the safety of the worker 2.

Because the operation of the robot 3 is not restricted in a situation in which only one of the worker 2 and the robot 3 has entered the third space R3, it is possible to avoid a reduction in productivity of the robot 3.

In this embodiment, although the camera 4 that is capable of acquiring the three-dimensional information is employed, there is no limitation thereto, and a camera 4 that is capable of acquiring two-dimensional information may be employed. The worker 2 or the robot 3 may be recognized by processing the images acquired by the camera 4.

With regard to setting and monitoring of the monitoring boundaries A and B, sensors such as area curtains or the like may be employed.

Figure 14:
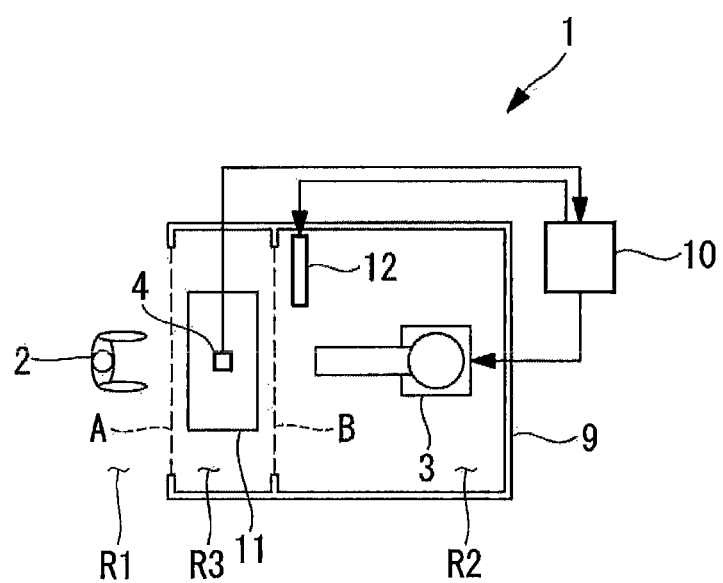
FIG. 14 shows a modification of the safety management system provided with a monitor for notifying results of state-judgment by a control portion.

In this embodiment, because the alert state, the alert-cancelled state, and the operation-restricted state are judged by the control portion 8, for example, as shown in FIG. 14, the judgment results thereof may be notified by using a notifying portion, such as a monitor 12 or the like, at a position that the worker 2 can view when he/she is in the first space R1 and the third space R3. By doing so, in the alert state in which the robot 3 has entered the third space R3, it is possible to prevent the operation of the robot 3 from being restricted due to careless entry of the worker 2 into the third space R3. As the notifying portion, a unit that issues a notice by means of an arbitrary method such as audio or the like may be employed instead of the monitor 12.

In this embodiment, although the system in which the robot 3 is installed in the second space R2 has been described as an example, alternatively, a moving robot that can move from the second space R2 to the third space R3 and the first space R1 may be employed. In this case, the robot 3 should be set to be capable of crossing both of the monitoring boundaries A and B, as with the worker 2.

In this embodiment, regarding changes of the flags F1, F2, F3, and FK, there are cases in which the flag F1 for the third space R3 unintentionally changes from "OFF" to "ON" even when the alert-cancelled state has been established. In this case, because it is unknown whether an object in the third space R3 is the worker 2 or the robot 3, the operation of the robot 3 may be restricted or stopped assuming that the object is the worker 2.

As a result, the following aspect is read from the above described embodiment of the present invention.

An aspect of the present invention provides a safety management method including: setting a third space that both a worker and a robot can enter between a first space in which the worker is mainly present and a second space in which the robot is mainly disposed; setting, between the first space and the third space and between the second space and the third space, respectively, monitoring boundaries for monitoring crossing thereof; monitoring the presence/absence of the robot or the worker in the third space; when a monitoring state of crossing of one monitoring boundary and a monitoring state of the worker or the robot in the third space are substantially simultaneously switched from "non-detection" to "detection", setting an alert state, in which the operation of the robot is restricted, when crossing of another monitoring boundary is detected; and canceling the alert state only when the monitoring state of crossing of the one monitoring boundary and the monitoring state of the worker or the robot in the third space are substantially simultaneously switched from "detection" to "non-detection".

With this aspect, the monitoring boundaries are set between the first space and the third space and between the second space and the third space, respectively, and crossing of the monitoring boundaries and the presence/absence of the robot or the worker in the third space are monitored. In the case in which the worker who is mainly present in the first space enters the third space by crossing the (one)

monitoring boundary, the monitoring state of crossing of the monitoring boundary is switched from "non-detection" to "detection", and, substantially simultaneously therewith, the monitoring state of the worker in the third space is switched from "non-detection" to "detection", and thus, the alert state is set. In this alert state, the operation of the robot is restricted when crossing of the (another) monitoring boundary between the second space and the third space by one of the worker and the robot is detected.

In contrast, in the case in which the robot that is mainly disposed in the second space enters the third space by crossing the (one) monitoring boundary, the monitoring state of crossing of the monitoring boundary is switched from "non-detection" to "detection", and, substantially simultaneously therewith, the monitoring state of the robot in the third space is switched from "non-detection" to "detection", and thus, in this case also, the alert state is set. In this alert state, the operation of the robot is restricted when crossing of the (another) monitoring boundary between the first space and the third space by one of the worker and the robot is detected.

The alert state is canceled only when the monitoring state of crossing of the (one) monitoring boundary, which has caused the alert state to be established, and the monitoring state of the robot or the worker in the third space are substantially simultaneously switched from "detection" to "non-detection".

For example, in the case in which the worker has completely entered the third space by crossing the (one) monitoring boundary between the first space and the third space, although the monitoring state of crossing of this monitoring boundary is switched from "detection" to "non-detection", because the worker remains in the third space and "detection" is maintained, the alert state is not canceled. In the case in which the worker who has completely entered the third space enters a blind spot in the third space, although the monitoring state of the worker in the third space is switched from "detection" to "non-detection", because the monitoring state of crossing of the (one) monitoring boundary does not change from "non-detection", the alert state is not canceled.

On the other hand, in the case in which the worker who has completely entered the third space completely moves out into the first space by crossing the (one) monitoring boundary, because, at a point in time when the worker has completely moved out into the first space after crossing of the monitoring boundary is detected again, both the monitoring state of crossing of the monitoring boundary and that of the worker in the third space are substantially simultaneously switched from "detection" to "non-detection", the alert state is canceled.

As has been described above, with this aspect, in the case in which one of the worker and the robot is in the third space, because the alert state is not canceled even if the monitoring state is switched to "non-detection" due to a blind spot or the like, although the operation of the robot is always restricted in a situation in which both the worker and the robot are in the third space, the operation of the robot is not restricted in a situation in which only one of them is in the third space. In other words, with this aspect, it is possible to more reliably ensure the worker safety without reducing the productivity of the robot. Here, ways in which the operation of the robot is restricted include reducing the operating speed of the robot in addition to stopping the robot.

In the above-described aspect, in a state in which the alert state is set, the robot may be stopped when crossing of the another monitoring boundary is detected.

By doing so, it is possible to more reliably ensure the worker safety.

The above-described aspect may include: acquiring, over time, images that include the third space and at least a portion of the first space and the second space adjacent to the third space; and monitoring crossing of the monitoring boundaries and the presence/absence of the worker or the robot in the third space on the basis of any one of the acquired images.

By doing so, it is possible to monitor crossing of the monitoring boundaries and the presence/absence of the worker or the robot in the third space by using only the acquired images, and it is possible to more accurately set and cancel the alert state.

In the above-described aspect, the image may be a three-dimensional distance image.

By doing so, it is possible to easily set the monitoring boundaries at arbitrary positions, and it is possible to easily monitor crossing of the set monitoring boundaries and the presence/absence of the worker or the robot in the third space.

In the above-described aspect, the worker may be notified that the alert state has been set.

By doing so, by notifying the worker about the alert state, it is possible to prevent the operation of the robot from being restricted due to careless crossing of the monitoring boundaries by the worker.

Another aspect of the present invention provides a safety management system comprising: a boundary setting portion that sets a third space that both a worker and a robot can enter between a first space in which the worker is mainly present and a second space in which the robot is mainly disposed, and sets monitoring boundaries between the first space and the third space and between the second space and the third space; a boundary-crossing monitoring portion that monitors crossing of the individual monitoring boundaries set by the boundary setting portion; an in-space monitoring portion that monitors the presence/absence of the worker or the robot in the third space set by the boundary setting portion; and a control portion that controls the robot on the basis of an output from the boundary-crossing monitoring portion and an output from the in-space monitoring portion, wherein, when a monitoring state of crossing of one monitoring boundary monitored by the boundary-crossing monitoring portion and a monitoring state of the worker or the robot in the third space monitored by the in-space monitoring portion are substantially simultaneously switched from "non-detection" to "detection", the control portion sets an alert state in which the operation of the robot is restricted, when crossing of another monitoring boundary is detected by the boundary-crossing monitoring portion, and the control portion cancels the alert state only when the monitoring state of crossing of the one monitoring boundary monitored by the boundary-crossing monitoring portion and the monitoring state of the worker or the robot in the third space monitored by the in-space monitoring portion are substantially simultaneously switched from "detection" to "non-detection".

With this aspect, the boundary setting portion sets the third space between the first space and the second space and the monitoring boundaries between the first space and the third space and between the second space and the third space. Then, the boundary-crossing monitoring portion monitors crossing of the two monitoring boundaries, and the in-space monitoring portion monitors the presence/absence of the worker or the robot in the third space. Because the control portion sets the alert state when a monitoring state of crossing of the one monitoring boundary and a monitoring state of the worker or the robot in the third space are substantially simultaneously switched from "non-detection" to "detection", the control portion restricts the operation of the robot at a point in time when crossing of the another monitoring boundary is subsequently detected. Because the alert state is canceled only when the monitoring state of crossing of the one monitoring boundary and the monitoring state of the worker or the robot in the third space are substantially simultaneously switched from "detection" to "non-detection", it is possible to more reliably ensure the worker safety without reducing the productivity.

In the above-described aspect, in a state in which the alert state is set, the control portion may control the robot so as to stop the robot when crossing of the another monitoring boundary is detected by the boundary-crossing monitoring portion.

By doing so, it is possible to more reliably ensure the worker safety.

The above-described aspect may be provided with an image acquisition portion that acquires, over time, images that include the third space and at least a portion of the first space and the second space adjacent to the third space, wherein the boundary-crossing monitoring portion and the in-space monitoring portion may monitor crossing of the monitoring boundaries and the presence/absence of the worker or the robot in the third space on the basis of any one of the images acquired by the image acquisition portion.

By doing so, it is possible to monitor crossing of the monitoring boundaries and the presence/absence of the worker or the robot in the third space by using only the images acquired by the image acquisition portion, and it is possible to more accurately set and cancel the alert state.

In the above-described aspect, the image may be a three-dimensional distance image.

By doing so, it is possible to easily set the monitoring boundaries at arbitrary positions, and it is possible to easily monitor crossing of the set monitoring boundaries and the presence/absence of the worker or the robot in the third space.

The above-described aspect may be provided with a notifying portion that notifies the worker that the alert state has been set by the control portion.

By doing so, by notifying the worker about the alert state by means of the notifying portion, it is possible to prevent the operation of the robot from being restricted due to careless crossing of the monitoring boundaries by the worker.

REFERENCE SIGNS LIST 1 safety management system
2 worker
3 robot
4 camera (image acquisition portion)
5 boundary setting portion
6 boundary-crossing monitoring portion
7 in-space monitoring portion
8 control portion
12 monitor (notifying portion)
A, B monitoring boundary
R1 first space
R2 second space
R3 third space

The invention claimed is:

1. A safety management method comprising:
setting a third space that both a worker and a robot can enter between a first space in which the worker is mainly present and a second space in which the robot is mainly disposed;
setting, between the first space and the third space and between the second space and the third space, respectively, monitoring boundaries for monitoring crossing thereof;
monitoring whether or not the robot or the worker is present in the third space;
when a monitoring state of crossing of one monitoring boundary and a monitoring state of the worker or the robot in the third space are substantially simultaneously switched from non-detection to detection, setting an alert state, in which the operation of the robot is restricted, when crossing of another monitoring boundary is detected; and
canceling the alert state only when the monitoring state of crossing of the one monitoring boundary and the monitoring state of the worker or the robot in the third space are substantially simultaneously switched from detection to non-detection.

2. The safety management method according to claim 1, wherein, in a state in which the alert state is set, the robot is stopped when crossing of the another monitoring boundary is detected.

3. The safety management method according to claim 1, comprising:
acquiring, over time, images that include the third space and at least a portion of the first space and the second space adjacent to the third space; and
monitoring crossing of the monitoring boundaries and whether or not the worker or the robot is present in the third space on the basis of any one of the acquired images.

4. The safety management method according to claim 3, wherein the image is a three-dimensional distance image.

5. The safety management method according to claim 1, wherein the worker is notified that the alert state has been set.

6. A safety management system comprising one or more processors and a non-transitory computer-readable medium storing instructions that, when executed by one or more of the processors, cause the safety management system to perform functions comprising:
setting a third space that both a worker and a robot can enter between a first space in which the worker is mainly present and a second space in which the robot is mainly disposed, and sets monitoring boundaries between the first space and the third space and between the second space and the third space;
monitoring crossing of the individual monitoring boundaries;
monitoring whether or not the worker or the robot is present in the third space; and
wherein, when a monitoring state of crossing of one monitoring boundary and a monitoring state of the worker or the robot in the third space are substantially simultaneously switched from non-detection to detection, setting an alert state in which the operation of the robot is restricted when crossing of another monitoring boundary is detected, and
canceling the alert state only when the monitoring state of crossing of the one monitoring boundary and the monitoring state of the worker or the robot in the third space are substantially simultaneously switched from detection to non-detection.

7. The safety management system according to claim 6, wherein, in a state in which the alert state is set, controlling the robot so as to stop the robot when crossing of the another monitoring boundary is detected.

8. The safety management system according to claim 6, comprising:
- a camera that acquires, over time, images that include the third space and at least a portion of the first space and the second space adjacent to the third space,
- wherein monitoring crossing of the monitoring boundaries and whether or not the worker or the robot is present in the third space on the basis of any one of the images acquired by the camera.

9. The safety management system according to claim 8, wherein the image is a three-dimensional distance image.

10. The safety management system according to claim 6, comprising a notifying portion having a monitor or an audio alarm configured to notify the worker that the alert state has been set.

* * * * *